MAGNETIC TRANSDUCER READING AND WRITING CONTROL SYSTEM

Filed Feb. 15, 1961 2 Sheets-Sheet 1

INVENTOR.
JOHN A. LAWRENCE
BY Samuel Lindenberg
ATTORNEY

MAGNETIC TRANSDUCER READING AND WRITING CONTROL SYSTEM

Filed Feb. 15, 1961 2 Sheets-Sheet 2

INVENTOR.
JOHN A. LAWRENCE
BY Samuel Lindenberg
ATTORNEY

United States Patent Office 3,152,322
Patented Oct. 6, 1964

3,152,322
MAGNETIC TRANSDUCER READING AND WRITING CONTROL SYSTEM

John A. Lawrence, Canoga Park, Calif., assignor to Thompson Ramo Wooldridge Inc., Canoga Park, Calif., a corporation of Ohio Filed Feb. 15, 1961, Ser. No. 89,420
7 Claims. (Cl. 340—174.1)

This invention relates to magnetic-memory systems and, more particularly, to improvements in arrangements for writing into and reading from a magnetic-memory system.

Magnetic-memory systems of the type which employ a moving magnetic medium, such as magnetic tape or magnetic drum, form an integral part of computers or data-handling systems. Patently, it is necessary that any information which is to be stored thereon should be correctly transferred through the writing circuits onto the recording magnetic surface and, conversely, should be correctly transferred from the recording magnetic surface through the reading circuits. When a plurality of magnetic transducers are employed, each of which is associated with a separate track, and to which switching techniques must be employed to select a given transducer with which a reading or recording operation is to be performed, there are problems presented. For example, transients due to switching can interfere with and adversely affect the data read back at a low level. Furthermore, high level signal currents applied to the writing winding of a transducer may be induced in the reading winding on that transducer, resulting in severe dissipation of the quiescent state of the low level signal amplifiers, making linear undistorted amplification difficult and complex. Also, accidental erasures of information can occur through switching inadvertencies or through power failures or through human or computer errors. Still another problem which has arisen is the one presented where it is desired to read data from a track immediately after data has been written into that track.

Some of the prior-art solutions to the problems indicated above are to provide a separate writing head and reading head for each recording track and to allow ample time between switching operations and reading and/or writing operations to permit switching transients to subside. A single head could not be used for reading immediately after writing, because time was required for the writing currents to subside before the reading operation could take place. It will be appreciated that there is more circuitry required for switching two heads per track for reading or writing than for switching one head per track.

Accordingly, an object of this invention is to provide a read-write track-selection system for a magnetic memory which is simpler and less costly than those used heretofore.

Another object of the present invention is the provision of a track-selection system for a magnetic memory using a single transducer for reading and writing wherein the recovery time required between a writing and a reading operation is much shorter than that experienced in the prior art.

Still another object of the present invention is the provision of a track-selection system for a magnetic memory wherein a single transducer is used for each track for both reading and writing.

Yet another object of the present invention is the provision of track-selection system for a magnetic memory wherein problems of crosstalk and transients are eliminated.

Yet another object of the present invention is the provision of a novel, useful, and simple track-selection system for a magnetic memory.

These and other objects of the invention may be achieved in an arrangement wherein, by way of example, a magnetic drum has in operative association therewith a plurality of transducers. Each one of these has two windings, one of which is employed for reading and the other for writing. The writing windings are arranged in groups, and each group is connected to a common line. Selection from the source of writing signals may be made of the common line, which is connected to a transducer over a desired track. Each writing winding is connected to a separate switch. Provision is made for closing, within a group only, that switch which is connected to the writing winding on a transducer over a track in which it is desired to write.

Each one of the reading windings has one end connected to a common read line and the other end connected to a switch. Accordingly, when it is desired to read from a track, the switch connected to the reading winding associated with the transducer over the desired track is closed.

In order to afford freedom from transients and crosstalk, an arrangement is made such that the output from the reading transducer sees a high impedance while the input to the read preamplifier is clamped to ground during the process of writing. During reading there is no high impedance presented and the clamp to ground is open. At the termination of the writing operation, a similar arrangement is made for clamping the input to the writing transducer, whereby the decay of write currents in the transducer and write circuit is made to occur very rapidly, and, further, any effects due to turning off the write-circuit currents are minimized. The clamping circuitry for the write circuit and the read circuit are also actuated during the process of the selection of the transducers for writing or reading, in order to eliminate the effects of any transients caused as a result of this switching.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
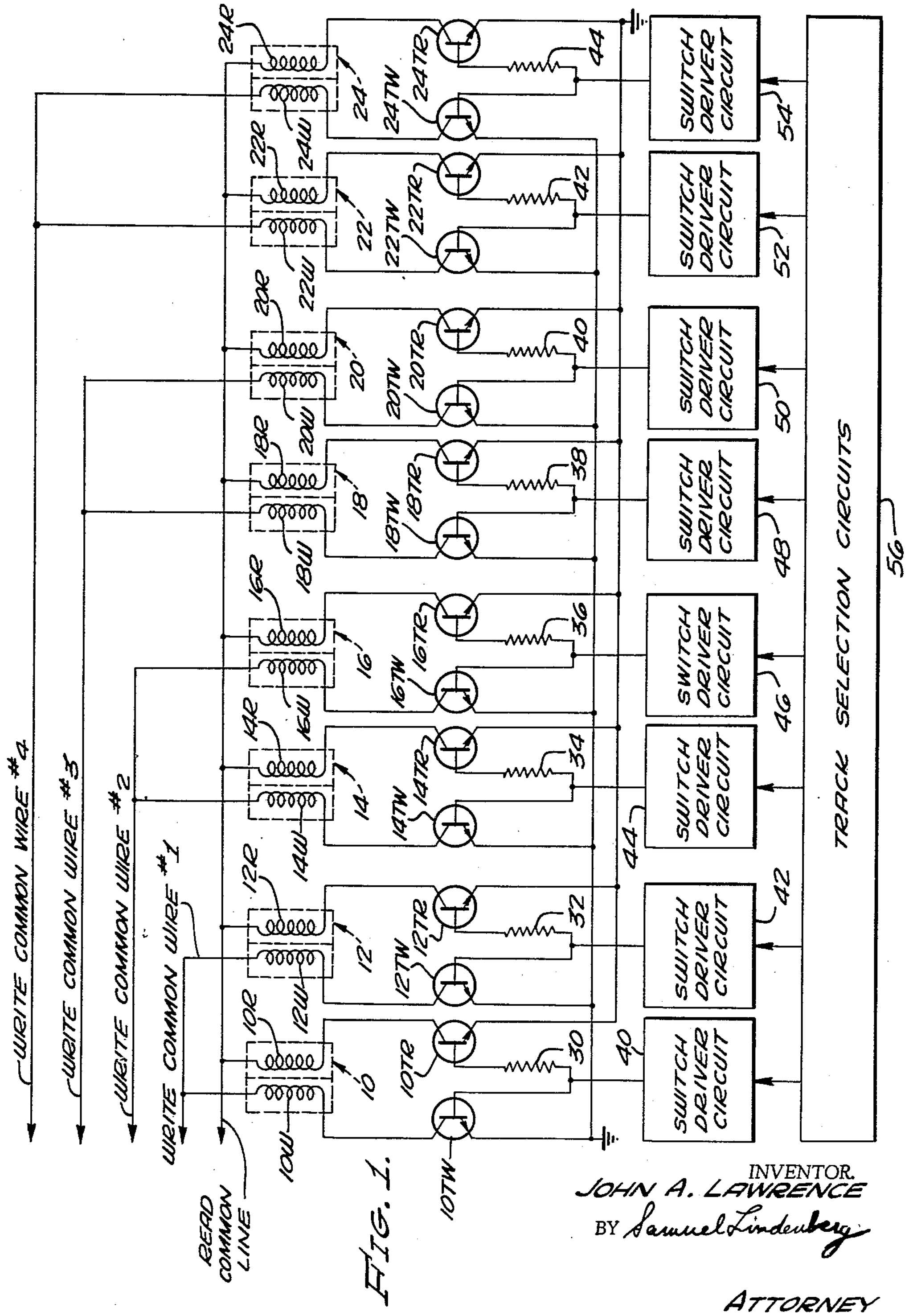
FIGURE 1 is a circuit diagram of an arrangement in accordance with this invention of the switching and selection circuits.

Referring now to FIGURE 1, there may be seen a circuit diagram of an arrangement of the head windings in accordance with this invention. By way of exemplification, and not to be construed as a limitation upon this invention, it will be assumed that the magnetic memory comprises a magnetic drum. There are positioned in operating relationship with the periphery of this drum, a plurality of transducer heads, for example, 10, 12, 14, 16, 18, 20, 22, and 24. Each one of these heads has two windings: one is the writing winding, for example, 10W, 12W, 14W, 16W, 18W, 20W, 22W, and 24W; and the other is a reading winding, for example, 10R, 12R, 14R, 16R, 18R, 20R, 22R, and 24R. The writing windings are organized into groups—by way of example, two of these windings, 10W, 12W, constitute a first group; windings 14W, 16W constitute a second group; windings 18W, 20W constitute a third group; and windings 22W and 24W constitute a fourth group. One end of each one of the writing windings in a group is connected to a wire, respectively designated as the write common wire No. 1, the write common wire No. 2, the write common wire No. 3, and the write common wire No. 4. One end of windings 10W and 12W is connected to the write common wire No. 1; one end of the windings 14W and 16W is connected to write common wire No. 2; one end of the windings 18W, 20W is connected to write common wire No. 3; and one end of the windings 22W and 24W is connected to the write common wire No. 4.

One end of each one of the reading windings respectively 10R, 12R, 14R, 16R, 18R, 20R, 22R, 24R is connected to a common wire or bus 26. This is designated as the "read common line" 26.

There is provided for each one of the write windings a separate switching transistor respectively 10TW, 12TW, 14TW, 16TW, 18TW, 20TW, 22TW, 24TW. There is provided for each one of the reading windings 10R, 12R, through 24R an associated switching transistor respectively 10TR, 12TR, 14TR, 16TR, 18TR, 20TR, 22TR, 24TR. Each one of these switching transistors associated with the reading winding and with the writing winding has an emitter, collector and base. The collector of each switching transistor is connected to the other end of the winding with which it is associated. The emitters of each one of the switching transistors 10TW through 24TW which are associated with the writing windings are connected to ground. The emitters of each one of the transistors 10TR through 24TR which are associated with the reading windings are connected to the reading ground. There are resistors respectively 30, 32, 34, 36, 38, 40, 42, and 44, respectively having one end connected to the base of the transistors 10TR through 24TR, which are associated with the reading windings of each transducer. The other ends of each one of these resistors is connected to the base of the transistor associated with the writing winding of the same transducer head. From the foregoing it should be appreciated that a switching transistor is provided for each reading and writing winding on a transducer head. In order for writing currents to flow through the writing winding the switching transistor associated therewith must be conductive. In order for reading currents to flow through the reading winding its associated switching transistor must be conductive. When the switching transistors are biased off effectively neither reading nor writing current can flow. Control for the switching transistors is provided by circuits designated as switch-driver circuits.

There is one switch-driver circuit provided for the switching transistors associated with the writing and reading winding on each transducer. These are respectively designated as switch-driver circuits, 40, 42, 44, 46, 48, 50, 52, 54. The base of switching transistor 10TW and the connection of resistor 30 is connected to switch-driver circuit 40. The base of switching transistor 12TW and the end of resistor 32 is connected to switch-driver circuit 42. Transistor 14TW has its base and resistor 34 has its other end connected to switch-driver circuit 44. The base of transistor 16TW and the resistor 36 are connected to switch-driver circuit 46. The junction of transistor 18W's base and the resistor 38 are connected to switch-driver circuit 48. The junction of the base of transistor 20TW and resistor 40 are connected to switch-driver circuit 50. The junction of the base of the transistor 22TW and resistor 42 are connected to the switch-driver circuit 52. The junction of the base of transistor 24TW with one end of the resistor 44 are connected to the switch-driver circuit 54.

Each one of these switch-driver circuits when energized can apply a current to the bases of the transistors to which it is connected. The resistors in series with the bases of the switching transistors on the reading winding side of the transducers reduce the value of the drive current since less current will flow through the transducer winding, which is used for the purpose of reading what is recorded on a magnetic surface, than flows when a transducer winding is driven from a signal source for the purpose of writing on the magnetic surface. The current applied to the bases of the respective switch transistors is sufficient to saturate them and effectively minimize the voltage drop between the collectors and emitters of these transistors. As a result the ends of the respective windings which are connected to the collectors of these transistors are substantially connected to the writing ground or reading ground as the case may be for the writing and reading windings.

Although a switch-drive circuit may constitute any arrangement for providing, when energized, the required driving currents to the bases of the transistors connected thereto and when not energized providing cutoff bias to the basis of these transistors, a preferred arrangement for both the transducer head and its associated switch as well as the switch-driver circuit may be found described and claimed in an application by this inventor entitled, "Magnetic Recording Head Switch Circuit" filed February 13, 1961 and bearing Serial No. 88,983.

A rectangle designated as track selection circuits 56 serves the function of energizing the one of the switch-driver circuits 40 through 54 which applies current to close the track switches of a transducer head over a track into which it is desired to write or from which it is desired to read. Such track selection circuits are well known addressing circuits and may comprise for example a register, or an addressing matrix. The switch-driver circuits may also each comprise a different flip-flop which is driven to its set state when its input is energized by the track-selection circuits thereby applying the required base drive currents and which in its reset state biases off the associated track switches. When it is desired to write in a predetermined track the track-selection circuits are energized to select and energize the one of the switch-driver circuits which provides base drive current to the track switches connected to the write and read windings of the transducer over that track.

Data signals are applied to the one of the write common wires which are connected to the write winding on the transducer over the desired track. Although these data signals are applied to two write windings, since only one track switch is closed while the other is maintained open by reason of the bias applied to the track-switch transistor from the inactivated switch-drive circuit, the writing will occur in only the desired track.

When it is desired to read from a predetermined track, the same set of circuits are employed for selecting and enabling the reading operation as are employed for selecting and enabling the writing operation. That is, the same set of track-selection circuits are used and also the same set of switch-driver circuits are used. Since the track-switch for only one reading winding is closed or alternatively stated, only one switching transistor has drive current applied thereto to render it conductive while all the others are maintained nonconductive, the reading signal will be derived from only one read winding. This is fed by the read common line 26 to the reading preamplifier.

Figure 2:
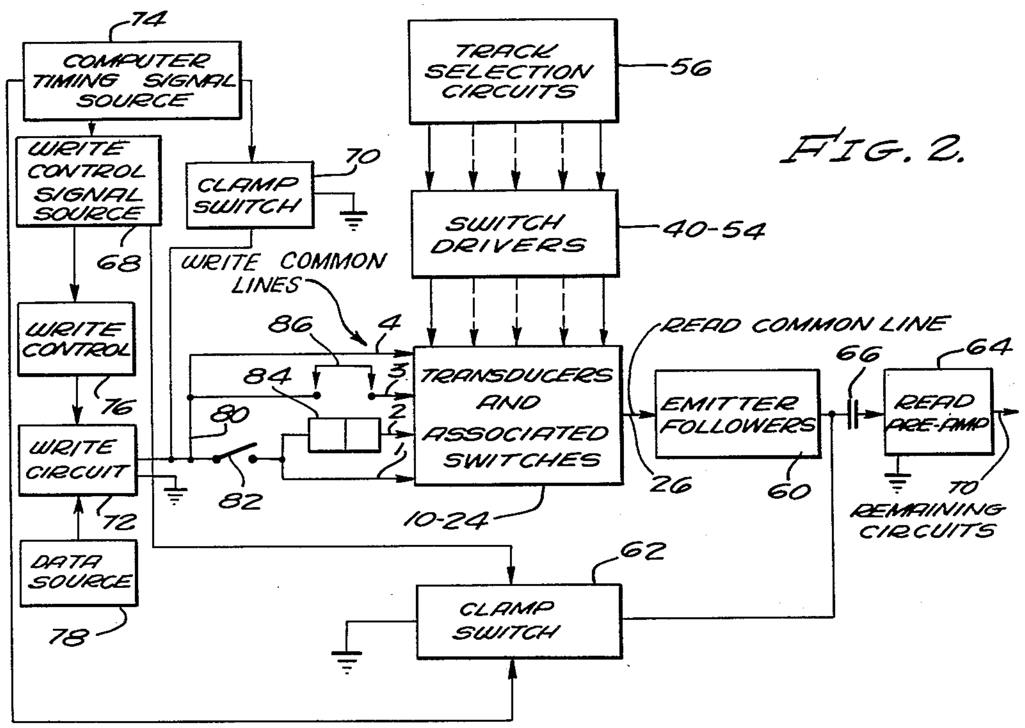
FIGURE 2 is a block diagram illustrating, in accordance with this invention, the writing and reading circuits and the clamp switches.

Reference is now made to FIGURE 2 which shows a block diagram of a track-selection system in accordance with this invention. The track-selection cricuits 56 serve to select one of the switch-driver circuits 40 through 54, here represented as a single rectangle. A single rectangle represents the transducers and associated switches 10 through 24 which are shown in FIGURE 1. Thus, the switch drivers 40 through 54 are connected to the transducers and associated switches 10 through 24. A single read common line 26 is provided which is connected to one side of all the reading windings. The four write common wires 1, 2, 3, 4 are shown emanating from the rectangle 10–24 and are connected to one side of each writing winding in a group. It should be appreciated that the portion of FIGURE 2 which has been thus far described is a simplified representation of the circuitry shown in FIGURE 1. The read common line is connected to a rectangle designated as emitter followers 60. As will be shown in FIGURE 3 these emitter followers 60 are complementary emitter followers which are employed together with the read stabilization clamp switch 62 to stabilize the reading operation and to prevent any signals which may occur as the result of the writing operation from passing through to the read preamplifier 64 which is connected to the output of the emitter followers 60 through the capacitor 66.

Control of the clamp switch 62 is achieved either by a signal from a write control signal source 68 or from a computer timing signal source 74. These comprise any well-known arrangement of circuits found in any present day computer. The write control signal source is actuated by the computer timing signal source to provide an output signal indicative of the fact that the writing operation is to take place. The write control signal source 68 applies its output to the clamp switch 62 to render it operative to clamp the output of the emitter followers 60. The read stabilization clamp switch 62 is also rendered operative during the time that the track selection circuits 56 are being adjusted to make a new selected by an output directly from the computer timing signal source 74. The computer timing signal source can be a counter circuit or circuits which, in response to the clock pulse signals of the computer, provide the basic timing for operation of the computer with its outputs. Such basic timing includes digit timing, word timing, state timing, etc.

Another stabilization clamp switch 70 which is identical with the clamp switch 62 is driven by the same signal from the computer timing signal source 74 as is applied to the clamp switch 62 during the interval over which the track-selection circuits are being actuated to select another switch driver. The clamp switch 70 serves to cause a rapid decay of write signals and to prevent any output of the write circuit being applied to a transducer head during a short interval following the termination of writing. In an embodiment of the invention which was built, this interval was on the order of one digit time. When the write signal from the signal source 68 terminates, the computer timing signal source provides a signal to actuate the clamp switch 70 whereby no further output from the write circuit can be applied to the transducers and furthermore, the current existing in the transducers can be rapidly dissipated whereby reading can be substantially instantaneously initiated following the writing operation.

The write control signal source 68 also applies its write signal to write control circuit 76 to drive it to enable the write circuit 72 to be responsive to signals from the data source 78. The write circuit 72 applies its output to a common bus 80. This common bus may be connected to a selector switch 82 which can be disconnected manually or through relays or which can even comprise diodes which are blocked by suitable biasing means, when it is desired to effectively isolate the write common lines 1 and 2 from the write circuit. This is done to prevent accidental erasure of information in the memory, which is of the utmost importance. The write common line No. 1 is connected directly to a terminal of the switch 82. The write common line No. 2 is connected, for example, by a jack and plug arrangement 84 to the terminal of the switch 82. The jack and plug arrangement 84 may be opened manually whenever such precaution is desired. Another arrangement for isolating the write common lines from the output of the write circuit 72 is the jumper 86 which is manually inserted or removed to connect the write common line No. 3 to the common bus 82. The write common line No. 4 is directly connected to the output of the write circiut. From the foregoing it will be appreciated that any arrangement either manual or automatic may be employed for selecting and/or connecting a desired 1 of 4 of the write common lines to the output of the write circuit. Selection of the one of the group of transducers to which a write common line is connected, which is energized for writing, is effectuated by means of the circuitry shown in FIGURE 1. During the writing operation, the clamp switch 62 is energized in response to the signal from the write control signal source and effectively isolates the read preamplifier 64 from the preceding circuit.

The circuit designated as write control signal source 68 may be a flip-flop circuit. The write control 76 may be an amplifier circuit. The write circuit 72, and data source 78, are respectively a power amplifier and a source of data signals. All these circuits are representative of circuits well known in the art and shown in the literature directed thereto. Accordingly, detail thereof will not be shown herein.

By way of summary of the operation of the invention shown in FIGURE 2, when it is desired to write on a predetermined track, the track-selection circuits 56 are set to address the one of the switch drivers 40 through 54 whose output will provide the necessary drive current to the bases of the read and write switch transistors associated with the read and write winding on the transducer which is over the desired track. During the interval required for the track-selection circuits to operate, an output from the computer timing signal source 74 is applied to the read stabilization clamp switch 62 and to the clamp switch 70 whereby they effectively ground any transients generated by this selection process, thereby keeping them out of the read preamplifier. The write common line which is connected to the transducer group including the transducer over the desired track is also connected to the bus 80 connected to the input connected to the write circuit 72.

The track-selection circuits 56 having operated to select a switch driver the clamp switch 70 is rendered inoperative. If writing is to be done then the write control signal source applies an output signal to the write control circuit 76 and to the clamp switch 62 which again is rendered operative to prevent any output from the write circuit reaching the read preamplifier 64. The write control circuit enables the write circuits to respond to signals received from the data source 78. The write circuit then can apply these writing signals to the selected transducer over the desired track. At the termination of the writing operation the write control signal source 68 terminates its output. Write control circuit 76 and write circuit 72 as the result are de-activated. The computer timing signal source then provides an output signal which actuates clamp switch 70 again. This effectively grounds the output of the write circuit and causes the writing currents induced to the transducer head to be dissipated rapidly.

When it is desired to read the data written in a desired track on the magnetic memory, then the track-selection circuits 56 are again actuated to address the one of the switch drivers 40 through 54 which will apply current to the transistor switches associated with the transducer over the desired track. During this time, that is during the operation of the track-selection circuits to achieve the desired address position, clamp switches 70 and 62 are energized and prevent the read preamplifier 64 from receiving any transient signals. At that time emitter followers 60 present a high impedance to the reading winding of the selected transducers. When the track-selection circuits 56 are set both clamp switch 70 and read stabilization clamp switch 62 are rendered inoperative. The impedance of the emitter followers 60 then returns to normal. The signals read by the transducer over the desired track are applied through the emitter follower 60 through the read preamplifier 64 and thereafter to the remaining circuits of the data handling system. This operation will continue until the track-selection circuits are actuated pursuant to another reading operation or pursuant to another writing operation.

Figure 3:
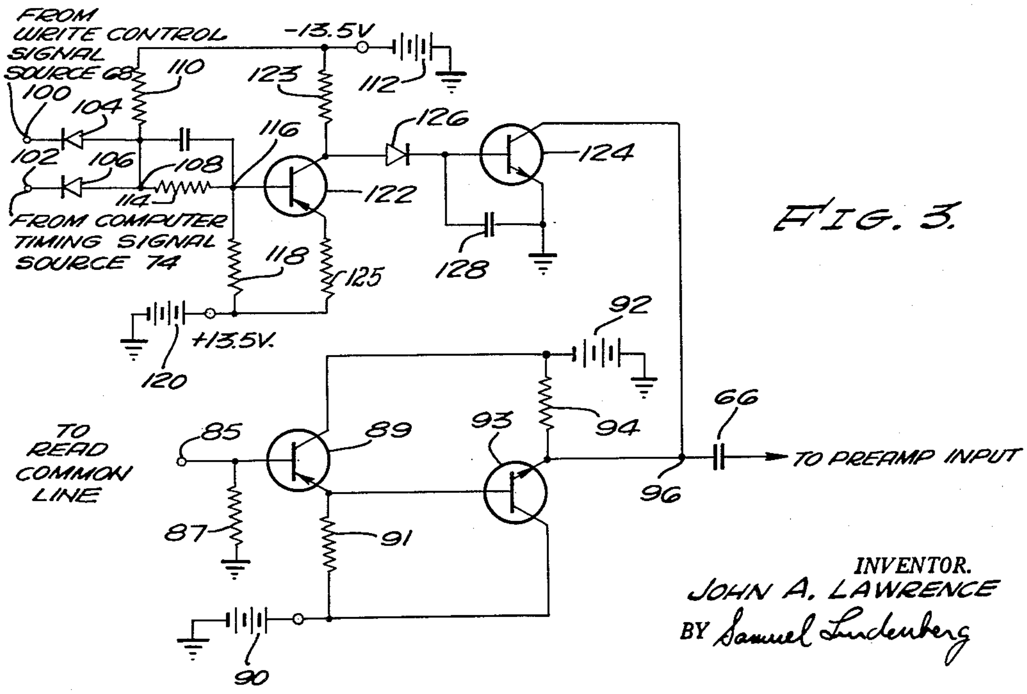
FIGURE 3 is a circuit diagram of complementary emitter followers and the clamp switch, in accordance with this invention.

FIGURE 3 is a circuit diagram of the emitter follower 60 and the clamp circuit 62. The portion of the circuit shown in FIGURE 3 not designated as the emitter followers can constitute either the clamp switch 62 or the clamp switch 70. The emitter followers 60 actually comprise two transistors respectively 89, 93. Transistor 89 which is a PNP transistor has a base, emitter and collector electrodes as does transistor 93 which is an NPN or opposite impurity type transistor. The read common line 26 is connected to a terminal 85 which is connected to the base of transistor 89. A resistor 87 also connects this base to ground. The emitter of transistor 89 is connected through a resistor 91 to a source of positive potential 90. The collector of transistor 89 is connected to a source of negative potential 92. The emitter of transistor 89 is connected to the base of transistor 93. The emitter of transistor 93 is connected through a resistor 94 to the source of negative potential 92. The collector of transistor 93 is connected to the source of positive potential 90. The emitter of transistor 93 is connected to a terminal 96 to which the portion of the circuitry previously referred to as the clamp switch or read stabilization clamp switch is connected. At this point it should be noted that the transistors 89 and 93 are connected in a manner which can be designated as complementary emitter followers.

The clamp switch portion of the circuit will have one or more input terminals 100, 102 which, for example, may receive a signal from the write control signal source or from the computer timing signal source circuits respectively. These are connected through respective diodes 104, 106 to a junction 108. This junction is connected through a resistor 110 to a source of positive potential 112. A resistor 114 connects the junction 108 to a second junction 116. This junction a resistor 118 connects to a source of positive potential 120. This junction is also connected to the base of a PNP transistor 122. It should be noted that resistors 110, 114 and 118 which are connected between the potential sources 112 and 120 serve as a voltage divider, the purpose of which is to provide a signal to the base of transistor 122 during the quiescent or standby period to maintain this transistor nonconductive. Whenever a signal is received which is applied to the junction 108 this signal from this junction is transferred to the base of transistor 122 and renders it conductive. Resistors 123 and 125 respectively connect the collector and emitter of transistor 122 to negative and positive reference potentials.

A second transistor 124 serves as a clamp switch. This transistor has collector, emitter and base electrodes. Its base is connected through a diode 126 to the collector of transistor 122. Its base is connected through a bypass capacitor 128 to ground. Its emitter is connected to ground. The collector of transistor 124 is connected to the junction 96.

Operation of the circuit shown in FIGURE 3 is as follows. While information is being written on to the magnetic memory, a large alternating current signal may appear on the read common line as a result of the proximity of the read winding on the common transducer to the write winding. During this time, however, the preamplifier input (junction 96) is clamped to ground by reason of the fact that a signal from the write control signal source has rendered transistor 122 conductive and therewith transistor 124. It should be noted that transistor 124 has been previously nonconductive by virtue of the isolation of its base through capacitor 128 and diode 126. When transistor 122 is rendered conductive, its collector goes positive as a result of which current can flow through diode 126 into the base of transistor 124. The transistor 124 can then become conductive in saturation and in view of the fact that the collector emitter voltage is on the order of a few tenths of a volt essentially junction 96 is clamped to ground through the emitter of transistor 124.

When the signal on the read common line swings positive the emitter of transistor 89 will try to swing positive with it, but because of the clamp at junction 96 the emitter of transistor 89 is effectively clamped close to ground. The base-emitter junction of transistor 89 will be back biased as the input terminal 85 goes positive and the input signal effectively locks at a high impedance which is presented as the transistor 89 is cut off. The base current applied to the transistor 93 is limited by keeping the value of the resistance 91 rather high. This holds the current through the clamping transistor 124 to a reasonable amount, which in an embodiment of the invention which was built ranged from 2 to 10 milliamps depending upon the beta of transistor 93. When the signal at the input terminal 85 goes negative, then transistor 89 behaves as a normal emitter follower, and its emitter will swing negative along with the input signal. Now, however, since the junction 96 is still clamped to ground, transistor 93 will have its base emitter junction back biased. Transistor 93 will cut off. Once again the input terminal 85 and therewith the reading winding sees a high impedance as the result of the cut-off transistor while the clamping current through transistor 124 is limited by the value of the resistance 94.

It can be seen as the result that while the preamplifier input is clamped to ground during the write mode, the read common lines still is connected into a high impedance, and inductive coupling between the read and write windings in the head have little or no effect on write current. The circuitry including transistors 122 and 124 which comprise the clamp switch 62 operates in identical fashion as described when used as the clamp switch 70. The junction 96 is made at the output of the write circuit 72 at that time.

There has been accordingly described and shown herein a novel, useful and simple circuit for selecting transducers employed with a magnetic memory. The use of this circuit enables a single transducer head to be employed over each track which can be actuated for reading or writing with a minimum delay interval therebetween. Thus, this system enables a faster operation than heretofore thought possible. The system is flexible since it can be expanded easily and inexpensively if desired. The system enables the single reading circuit to be employed for servicing a plurality of transducers as well as a single writing circuit. Selected sections of the memory are positively protected against accidental erasure by an arrangement for physically disconnecting the write winding. Further by virtue of the use of this circuit two windings can be employed with the same transducer head whereby each winding can be wound to match its terminal impedance allowing much more efficient operation in each mode.

What is claimed is:

1. In a data-storage system of the type employing a moving magnetizable surface and a magnetic transducer positioned in operative relationship to said magnetizable surface, said transducer having a separate winding for writing and for reading, reading means for deriving signals from said transducer, means coupling said reading means to both ends of said reading winding including first switch means for shorting the input of said reading means while said transducer is used for writing, means for producing writing signals for said transducer, and means for coupling said means for producing writing signals to both ends of said writing winding including means for shorting both ends of said writing winding for a predetermined interval at the termination of writing signals from said means for producing writing signals.

2. In a data-storage system as recited in claim 1 wherein said means coupling said reading means to both ends of said reading winding includes means for presenting a high impedance to signals induced in said reading winding when said first switch means is shorting the input of said reading means and for presenting a low impedance when said first switch is not shorting the input of said reading means.

3. In a data-storage system of the type employing a moving magnetizable surface and a magnetic transducer positioned in operative relationship to said magnetizable surface, said transducer having a separate winding for reading and for writing, a first and second normally open switch, a write ground terminal, a read ground terminal, means for connecting said first switch between one end of said writing winding and said write ground terminal, means for connecting said second switch between one end of said reading winding and said read ground terminal, means for applying writing signals to said transducer, means for connecting output from said means for applying writing signals to the other end of said writing winding and to said write ground terminal, a first normally open clamp switch connected between said other end of said writing winding and said write ground terminal, reading means for deriving output signals from said transducer, means connecting the input of said reading means to the other end of said reading winding and to said read ground terminal, a second normally open clamp switch connected across the input of said reading means, means for closing said first and second normally open switches when it is desired to read or write, means for closing said second normally open clamp switch during the application of writing signals to said transducer to short the input to said amplifier means, and means for closing said first clamp-switch means for a predetermined interval at the termination of the application of said writing signals to said transducer to short together said writing winding ends.

4. In a data-storage system as recited in claim 3 wherein said first normally open clamp switch includes a first and second transistor of opposite inpurity types each having emitter, collector and base electrodes, said second transistor emitter electrode being connected to said write ground terminal, said second transistor collector electrode being connected to said writing winding other end, a diode coupling said second transistor collector to said first transistor base, a first resistor connected to said second transistor collector, a second resistor connected to said second transistor emitter, means for applying operating potential to said second transistor through said first and second resistors, means for applying a bias to said second transistor base to maintain it and said first transistor nonconductive, means for applying a signal to the base of said second transistor to overcome said bias to render said first and second transistors conductive over a predetermined interval when said means for applying write signals terminates its application of signals to said transducer; said second normally open clamp switch includes a third and fourth transistor of opposite impurity types each having emitter, collector and base electrodes, said third transistor emitter and collector electrodes being respectively connected across said reading amplifier means input, a diode coupling said third transistor base to said fourth transistor collector, a third resistor connected to said fourth transistor collector electrode, a fourth resistor connected to said fourth transistor emitter electrode, means for applying operating potential to said fourth transistor through said third and fourth resistors, means for applying a bias to said fourth transistor base to maintain said third transistor nonconductive when said fourth transistor is nonconductive, and means for applying a signal to the base of said fourth transistor to overcome said bias and to render it conductive and said third transistor conductive therewith responsive to the application of write signals to said transducer.

5. In a data-storage system as recited in claim 4 wherein said means coupling the input of said reading means to said writing winding other end and to said read ground terminal includes a first and second transistor of opposite impurity types, each having base, emitter and collector electrodes, said first transistor base electrode being coupled to said reading winding other end, said second transistor emitter being coupled to said reading means input a connection between said first transistor emitter and said second transistor base, a first resistor having one end connected to said first transistor emitter and other end connected to said second transistor collector, a second resistor having one end connected to said second transistor emitter and said first transistor collector, and means for applying operating potential for said first and second transistors to said first and second resistor other ends.

6. In a data-storage system of the type employing a moving magnetizable surface and a transducer in operative relation therewith having a reading winding thereon and a preamplifier coupled to both ends of said reading winding for deriving reading signals therefrom, apparatus for preventing signals from said reading winding from reaching said preamplifier input when it is not desired that they do so comprising a normally open clamp switch connected across the input to said preamplifier, means for closing said normally open clamp switch to substantially short the input of said preamplifier when it is not desired that signals from said winding reach said preamplifier input, and a means connected between said preamplifier input and said reading winding for presenting a high impedance to said reading winding when said normally open clamp switch is closed and for presenting a low impedance to said reading winding when said normally open clamp switch is open.

7. In a data-storage system of the type employing a moving magnetizable surface and a transducer in operative relation therewith having a reading winding thereon and a preamplifier coupled having first and second input terminals to said reading winding for deriving reading signals therefrom, apparatus for preventing signals from said reading winding from reaching said preamplifier input when it is not desired that they do so comprising a first and second transistor of opposite impurity types each having a base, emitter and collector electrode, said first transistor base electrode to one end of said reading winding, said second transistor emitter being connected to said preamplifier first input terminal, a connection between said first transistor emitter and said second transistor base, a first resistor having one end connected to said first transistor emitter and the other end connected to said second transistor collector, a second resistor having one end connected to said second transistor emitter and said first transistor collector, means for applying operating potential for said first and second transistors to said first and second resistor other ends a third and fourth transistor of opposite impurity types each having emitter collector and base electrodes, said third transistor collector electrode being coupled to said second transistor emitter, said third transistor collector being connected to said reading winding other end and to said preamplifier second input terminal, a diode coupling said third transistor base to said fourth transistor collector, a fourth resistor connected to said fourth transistor emitter, means for applying operating potential to said fourth transistor through said third and fourth resistors, means to apply a bias to the base of said fourth transistor to maintain said fourth transistor and said third transistor nonconductive and to thereby enable said first and second transistors to transmit signals from said reading winding to said preamplifier input substantially unattenuated, and means to apply a signal to the base of said fourth transistor to render it conductive when it is desired to prevent signals from said transducer from reaching said preamplifier whereupon said third transducer is rendered conductive effectively shorting together said first and second input terminals and said first and second transducers operate to provide a high impedance to signals from said transducer.

References Cited in the file of this patent

UNITED STATES PATENTS

| | | |
|---|---|---|
| 2,849,703 | Bindon | Aug. 26, 1958 |
| 2,882,518 | Buhrendorf | Apr. 14, 1959 |
| 2,941,190 | Lindley | June 14, 1960 |
| 2,969,528 | Chen | June 24, 1961 |